United States Patent
Wiacek

(10) Patent No.: US 12,496,615 B2
(45) Date of Patent: Dec. 16, 2025

(54) APPLICATION OF INTUMESCENT AND VAPOR RETARDER COATINGS ON OPEN-CELL SPRAY POLYURETHANE INSULATION

(71) Applicant: CARLISLE CONSTRUCTION MATERIALS, LLC, Carlisle, PA (US)

(72) Inventor: Kevin Wiacek, Mechanicsburg, PA (US)

(73) Assignee: Carlisle Construction Materials, LLC, Carlisle, PA (US)

( * ) Notice: Subject to any disclaimer, the term of this patent is extended or adjusted under 35 U.S.C. 154(b) by 0 days.

(21) Appl. No.: 18/322,108

(22) Filed: May 23, 2023

(65) Prior Publication Data
US 2023/0398572 A1    Dec. 14, 2023

Related U.S. Application Data

(60) Provisional application No. 63/351,669, filed on Jun. 13, 2022.

(51) Int. Cl.
*B05D 7/00* (2006.01)
*C08J 9/30* (2006.01)
(Continued)

(52) U.S. Cl.
CPC ............... *B05D 7/58* (2013.01); *C08J 9/30* (2013.01); *C09D 109/06* (2013.01); *C09D 131/04* (2013.01); *C08J 2375/04* (2013.01)

(58) Field of Classification Search
CPC ... B05D 5/00; B05D 7/24; B05D 7/50; B05D 7/52; B05D 7/54; B05D 2201/02;
(Continued)

(56) References Cited

U.S. PATENT DOCUMENTS 3,934,066 A * 1/1976 Murch .................. E04B 1/94
442/221
5,743,056 A    4/1998 Balla-Goddard et al.
(Continued)

FOREIGN PATENT DOCUMENTS

WO    WO-2019099372 A1 *  5/2019   .......... C09D 133/08
WO    WO-2021046280 A1 *  3/2021   .............. B05D 1/02

OTHER PUBLICATIONS

Open vs. Closed Cell Foam: Understanding Permeability, Polymer Technologies, Inc. (Aug. 24, 2018), << https://blog.polytechinc.com/open-vs-closed-cell-foam-article/#:~:text=Due%20to%20the%20closely%20packed,denser%20than%20open%20cell%20foam >> (Year: 2018).*

*Primary Examiner* — William P Fletcher, III
(74) *Attorney, Agent, or Firm* — BakerHostetler

(57) ABSTRACT

A method of providing fire protection and vapor transmission resistance to a polyurethane foam insulation material, comprising: spraying an open cell polyurethane foam insulation onto a building structure; applying an intumescent paint onto the open cell polyurethane foam insulation; and then applying a vapor retarder paint over the intumescent paint. The vapor retarder paint may be a latex or styrene-butadiene rubber based paint, and the intumescent paint may be made of a water based acrylic or vinyl acetate copolymer and may have chemical additives that react to heat by swelling to generate a heat-insulating char layer that slows or prevents flame propagation.

18 Claims, 1 Drawing Sheet

(51) Int. Cl.
*C09D 109/06* (2006.01)
*C09D 131/04* (2006.01)

(58) Field of Classification Search
CPC ............ B05D 2401/20; B05D 2401/40; B05D 2502/00; B05D 2502/02; C08J 9/30; C08J 9/365; C08J 2205/05; C08J 2207/04; C08J 2375/04; C08J 2431/04; C08J 2433/00; C09D 5/185; C09D 109/06; C09D 131/04; E04B 1/665; E04B 1/80; E04B 1/942

USPC ................ 106/15.05, 18.11, 122; 252/1, 606

See application file for complete search history.

(56) References Cited

U.S. PATENT DOCUMENTS

| | | |
|---|---|---|
| 7,482,395 B2 | 1/2009 | Mabey et al. |
| 8,215,083 B2 | 7/2012 | Toas et al. |
| 9,097,011 B1 | 8/2015 | Barone et al. |
| 9,115,498 B2 | 8/2015 | Shiao et al. |
| 9,404,581 B1 | 8/2016 | Robinson |
| 9,453,116 B2 | 9/2016 | Mabey et al. |
| 10,487,218 B2 * | 11/2019 | Couturier ................ C09D 5/18 |
| 10,731,338 B1 | 8/2020 | Zemler et al. |
| 10,982,429 B2 | 4/2021 | Robinson |
| 2005/0031843 A1 | 2/2005 | Robinson et al. |
| 2005/0139126 A1 | 6/2005 | Khan et al. |
| 2008/0095971 A1 * | 4/2008 | McGee ..................... B32B 5/18 |
| | | 428/71 |
| 2009/0107068 A1 | 4/2009 | Manville |
| 2009/0246445 A1 | 10/2009 | Peterson |
| 2011/0174509 A1 * | 7/2011 | Quante ................ B32B 15/046 |
| | | 428/317.1 |

* cited by examiner

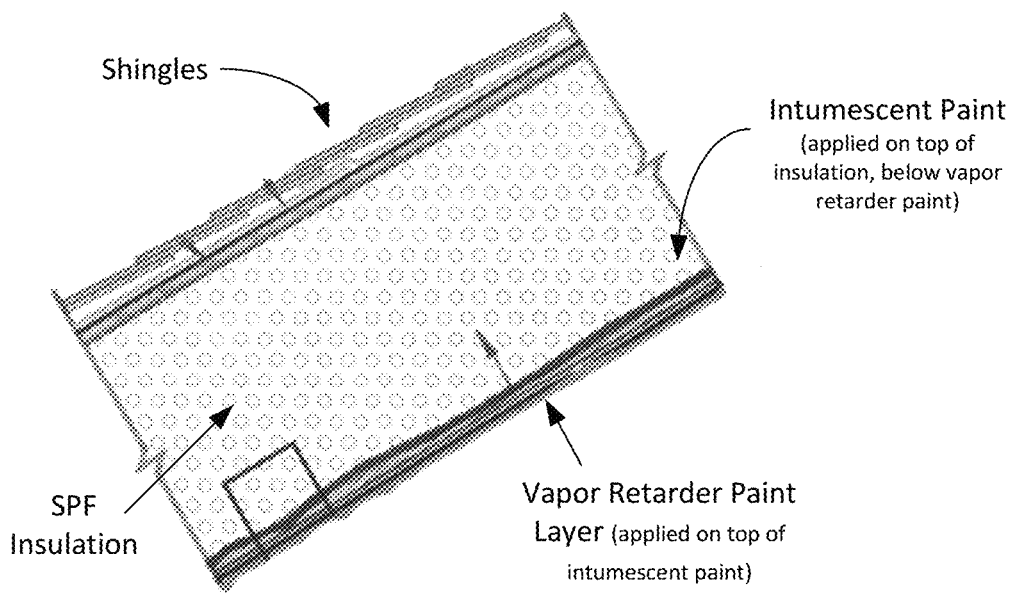

APPLICATION OF INTUMESCENT AND VAPOR RETARDER COATINGS ON OPEN-CELL SPRAY POLYURETHANE INSULATION

RELATED APPLICATION

The present application claims priority to U.S. Provisional Patent Application Ser. No. 63/351,669, of same title, filed Jun. 13, 2022, the entire disclosure of which is incorporated herein by reference in its entirety for all purposes.

TECHNICAL FIELD

The present invention relates to open-cell spray on polyurethane insulation.

BACKGROUND OF THE INVENTION

Open cell spray polyurethane foam (SPF) insulation has an open cell or porous polymeric structure that allows water vapor to permeate the foam. This prevents the application and use of open cell SPF in cold climate zones due to the potential of migrating water vapor moving through the foam and potentially condensing on a cold wood substrate, thereby causing moisture damage. For this reason, the international building code requires the use of an insulation product with a water vapor permeance rating (i.e.: "Perm") of less than 1 in cold climate zones.

Commercially available latex or styrene-butadiene rubber (SBR) based paint coatings that claim a Perm rating of <1 have been used to inhibit the moisture migration in these situations. However, these products have not been tested on open cell SPF as a substrate. Third party tests show that following the manufacturers installation instructions (i.e.: applying approximately 5 mils of Dried Film Thickness ("DFT") paint to the SPF) fail to create a smooth uniform coating, and also fail to meet the claimed permeance (Perm) rating.

This is because the SPF acts as a sponge absorbing the initial application of the paint into the foam, thereby preventing a water vapor barrier from forming (unlike when the paint coating is simply tested as a free-standing film or on a flat uniform substrate such as gypsum wallboard). Third party testing also shows that a less than 1 Perm rating can be achieved but only at thickness greater than 30 DFT and with multiple applications of the paint being required to ensure the SPF is completely covered and a uniform film thickness can be achieved.

Open-cell SPF applications also require the use of an intumescent paint coating to meet building code fire protection requirements. These intumescent paints have been tested at various thicknesses when applied to open-cell SPF to achieve different degrees of fire protection.

It would also be desirable to use intumescent paints due to the bulkiness of other intumescent systems (such as paper impregnated with intumescent technology) and installation challenges present in an attic where trusses, structural framing, utilities, and ductwork hinder applicator access to some areas. Additionally, intumescent systems need complete contact with the foam to be effective. SPF has an undulating surface profile due to the variations in the foam expansion process which limits intumescent systems to liquid applied products that ensure total foam coverage. It would also be desired to avoid vapor protection systems such as aluminum foil sheeting or plastic films due to the installation challenges mentioned above for intumescent. Instead, a vapor protection paint would be ideal. Therefore, what is instead desired is a system that provides both fire protection (using an intumescent paint), yet also provides vapor intrusion protection (using a standard latex or styrene-butadiene rubber (SBR) based paint.

However, it would also be desirable that such a system for fire protection and vapor intrusion protection did not require excessive thicknesses of either paint material. Ideally, achieving sufficient levels of both fire protection and vapor intrusion protection in a final product that is as thin as possible would be ideal.

SUMMARY OF THE INVENTION

The present method uses an intumescent paint layer as the primer for the vapor intrusion protection paint. By applying the intumescent paint layer first, and then later covering it with the vapor intrusion protection paint, surprising and unexpected benefits are seen. Specifically, the intumescent paint layer prevents the (later applied) vapor intrusion protection layer from simply being absorbed into the SPF foam. As a result, a much thinner layer of vapor intrusion protection paint can be applied than would be expected. Normally, a thick layer of vapor intrusion protection paint is required on the SPF foam. However, in accordance with the present method, the application of an intumescent layer of paint underneath the vapor intrusion protection paint permits the vapor intrusion protection paint layer to be surprisingly thin yet still achieve the desired vapor intrusion protection properties. Moreover, the thickness of the intumescent layer can also be reduced from what would normally be required. This is because latex-based paints are neither flammable or combustible they delay the rate of flame spread compared to an uncoated sample of SPF thereby allowing for a the thickness reduction of the intumescent layer.

BRIEF DESCRIPTION OF THE DRAWING

The FIGURE shows a roofing cross section in which the intumescent paint layer has been applied first to the SPF foam, and then covered by the vapor barrier paint layer.

DETAILED DESCRIPTION OF THE DRAWING

In preferred aspects, the present system provides a method of providing fire protection and vapor transmission resistance to a polyurethane foam insulation material, comprising: (a) spraying an open cell polyurethane foam insulation onto a building structure; (b) applying an intumescent paint onto the open cell polyurethane foam insulation; and then (c) applying a vapor retarder paint over the intumescent paint.

The vapor retarder paint is preferably a latex or styrene-butadiene rubber-based paint, and the intumescent paint is preferably made of a water based acrylic or vinyl acetate copolymer. The intumescent paint may optionally have chemical additives that react to heat by swelling to generate a heat-insulating char layer that slows or prevents flame propagation.

In preferred aspects, the thickness of the intumescent paint is less than 9 mils (0.23 mm) thick for thermal barrier fire performance. In more preferred aspects, the thickness of the intumescent paint is less than 3 mils (0.08 mm) thick for ignition barrier fire performance. In preferred aspects, the thickness of the vapor retarder paint is less than 17 mils (0.43 mm) thick.

In preferred embodiments, the intumescent paint coating is first applied to the open-cell SPF for fire protection purposes and creates a better substrate that allows for the reduction in the amount of vapor retarder applied to the SPF to achieve a Penn rating of less than 1. For example, as experimentally determined by the present inventor, a standard 30 mil (0.76 mm) Dried Film Thickness "DFT" can be reduced to 15 mil (0.38 mm) DFT if the intumescent paint is applied first. The first paint layer (i.e.: the intumescent layer) essentially acts as a primer to prevent the vapor retarder paint layer from being absorbed by the foam.

In preferred aspects, the vapor retarder paint layer is a solid latex based paint that may be specifically developed for use with SPF foam (as opposed to being a commercially available drywall vapor retarder paint that may not properly work with SPF foam because these paints may fail to form a uniform monolithic membrane at the prescribed thicknesses due to the low solids content, the molecular weight of the polymers, and the low viscosity of the paint coating). Achieving a perm rating of less than 1 with such commercially available drywall vapor retarder paints has the disadvantage of possibly requiring up to 10 coats at recommended applications rates. In contrast, in accordance with the present method, using a solid latex-based paint that has been specifically designed for SPF would ensure the viscosity of the coating and size and molecular weight of the polymer molecules allows for the pores in the foam to be filled completely while forming a uniform and seamless protective layer in a single application.

Lastly, in alternate preferred aspects, the vapor retarder layer is applied first to the SPF foam, and is then covered by the intumescent paint coating. This has the surprising benefit of reducing the amount of intumescent paint required as the vapor protection layer acts as a primer for the intumescent layer. Simply put, the present invention is the combination of the two types of paint coatings to allow for a synergistic reduction in required coating thickness when used together and achieve the desired vapor retarder and fire protection requirements.

What is claimed is:

1. A method of providing fire protection and vapor transmission resistance to a polyurethane foam insulation material, consisting of:
    spraying an open cell polyurethane foam insulation onto a building structure;
    applying an intumescent paint onto the open cell polyurethane foam insulation; and then
    applying a vapor retarder paint over the intumescent paint.

2. The method of claim 1, wherein the vapor retarder paint is a latex or styrene-butadiene rubber-based paint.

3. The method of claim 1, wherein the intumescent paint is made of a water based acrylic or a vinyl acetate copolymer.

4. The method of claim 3, wherein the intumescent paint further comprises chemical additives that react to heat by swelling to generate a heat-insulating char layer that slows or prevents flame propagation.

5. The method of claim 1, wherein the thickness of the intumescent paint is less than 3 mils (0.08 mm) thick for ignition barrier fire performance.

6. The method of claim 1, wherein the thickness of the intumescent paint is less than 9 mils (0.23 mm) thick for thermal barrier fire performance.

7. The method of claim 1, wherein the thickness of the vapor retarder paint is less than 17 mils (0.43 mm) thick.

8. The method of claim 1, wherein the building structure comprises roofing.

9. The method of claim 1, wherein the overall dried film thickness (DFT) is about 15 mils thick (0.38 mm).

10. A method of providing fire protection and vapor transmission resistance to a polyurethane foam insulation material, comprising:
    (i) firstly spraying an open cell polyurethane foam insulation onto a building structure; and
    (ii) secondly applying an intumescent paint onto the open cell polyurethane foam insulation and then applying a vapor retarder paint over the intumescent paint.

11. The method of claim 10, wherein the vapor retarder paint is a latex or styrene-butadiene rubber-based paint.

12. The method of claim 10, wherein the intumescent paint is made of a water based acrylic or a vinyl acetate copolymer.

13. The method of claim 12, wherein the intumescent paint further comprises chemical additives that react to heat by swelling to generate a heat-insulating char layer that slows or prevents flame propagation.

14. The method of claim 10, wherein the thickness of the intumescent paint is less than 3 mils (0.08 mm) thick for ignition barrier fire performance.

15. The method of claim 10, wherein the thickness of the intumescent paint is less than 9 mils (0.23 mm) thick for thermal barrier fire performance.

16. The method of claim 10, wherein the thickness of the vapor retarder paint is less than 17 mils (0.43 mm) thick.

17. The method of claim 10, wherein the building structure comprises roofing.

18. The method of claim 10, wherein the overall dried film thickness (DFT) is about 15 mils thick (0.38 mm).

* * * * *